Figure 1:
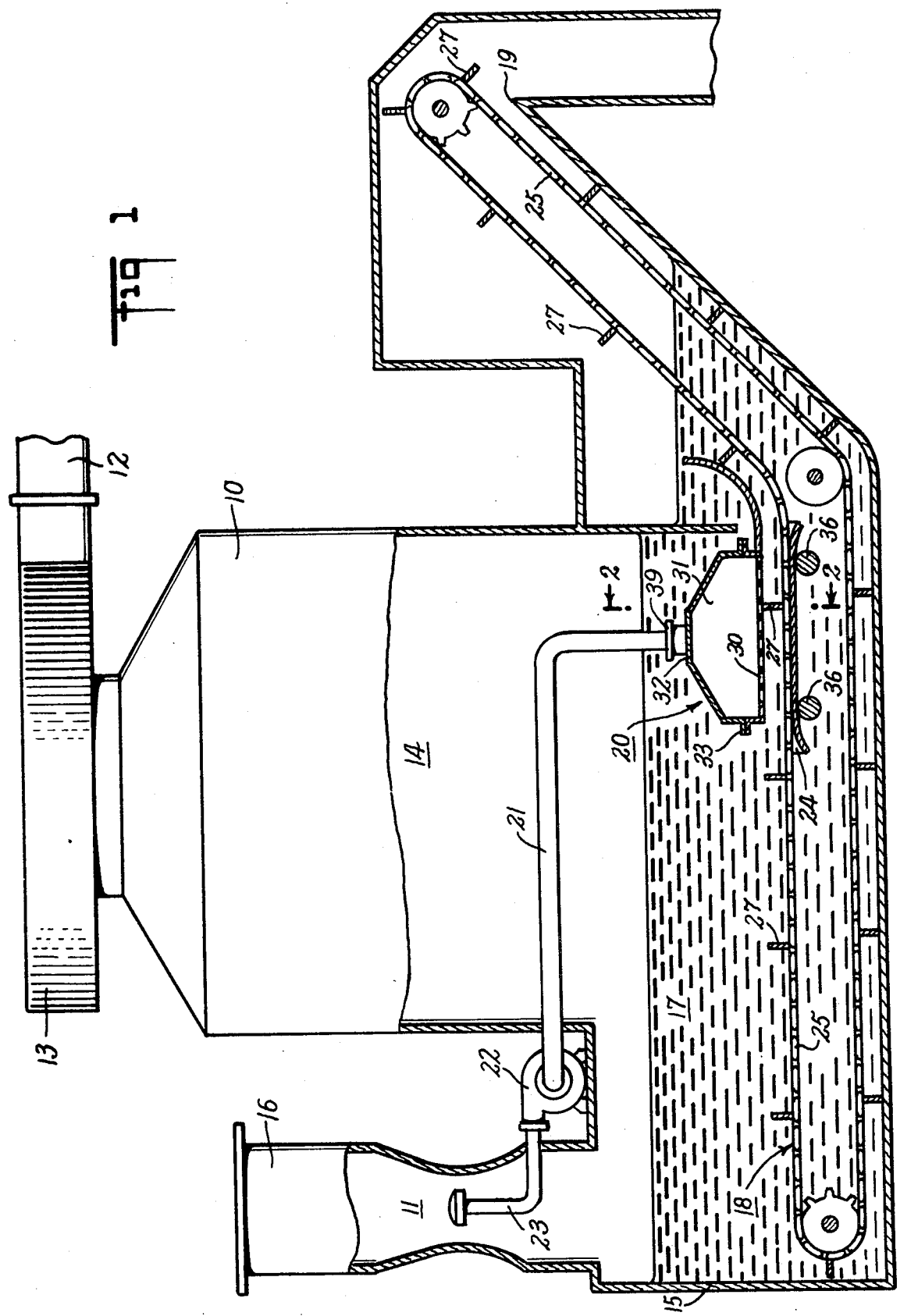

United States Patent [19]
Panzica

[11] 3,748,835
[45] July 31, 1973

[54] LIQUID FILTER FOR GAS WASHING APPARATUS

[75] Inventor: Nicholas J. Panzica, Danbury, Conn.

[73] Assignee: Peabody Engineering Corporation, New York, N.Y.

[22] Filed: Feb. 7, 1972

[21] Appl. No.: 224,194

[52] U.S. Cl. .................... 55/228, 55/229, 210/413
[51] Int. Cl. ............................................. B01d 47/06
[58] Field of Search .................... 55/228, 229, 295, 55/296, 297, 430; 210/106, 107, 153, 154, 159, 162, 170, 407, 408, 523

[56] References Cited
UNITED STATES PATENTS

| 513,123 | 1/1894 | Marmon | 55/430 X |
| 519,958 | 5/1894 | Hueffner et al. | 55/430 X |
| 1,693,754 | 12/1928 | Henry | 55/430 X |
| 1,720,702 | 7/1929 | Streun | 55/430 X |
| 1,881,270 | 10/1932 | Evars et al. | 210/162 X |
| 2,128,349 | 8/1938 | Briggs | 210/162 |
| 2,585,440 | 2/1952 | Collins | 55/228 X |
| 2,736,390 | 2/1956 | Wickland | 55/430 X |
| 3,221,885 | 12/1965 | Hirs | 55/297 X |
| 3,332,553 | 7/1967 | Casson | 210/107 X |

Primary Examiner—Dennis E. Talbert, Jr.
Assistant Examiner—Neil F. Greenblum
Attorney—Nathaniel L. Leek

[57] ABSTRACT

A liquid filter for a reservoir for a liquid carrying settleable solids which are removed by a sludge conveyor having transverse vanes or blades for advancing the sludge. The filter comprises a screen forming one side of an enclosure disposed below the liquid level in the reservoir in a position such that the vanes of the return flight of the conveyor scrape along the surface of the screen to remove entrapped particles from the screen.

3 Claims, 2 Drawing Figures

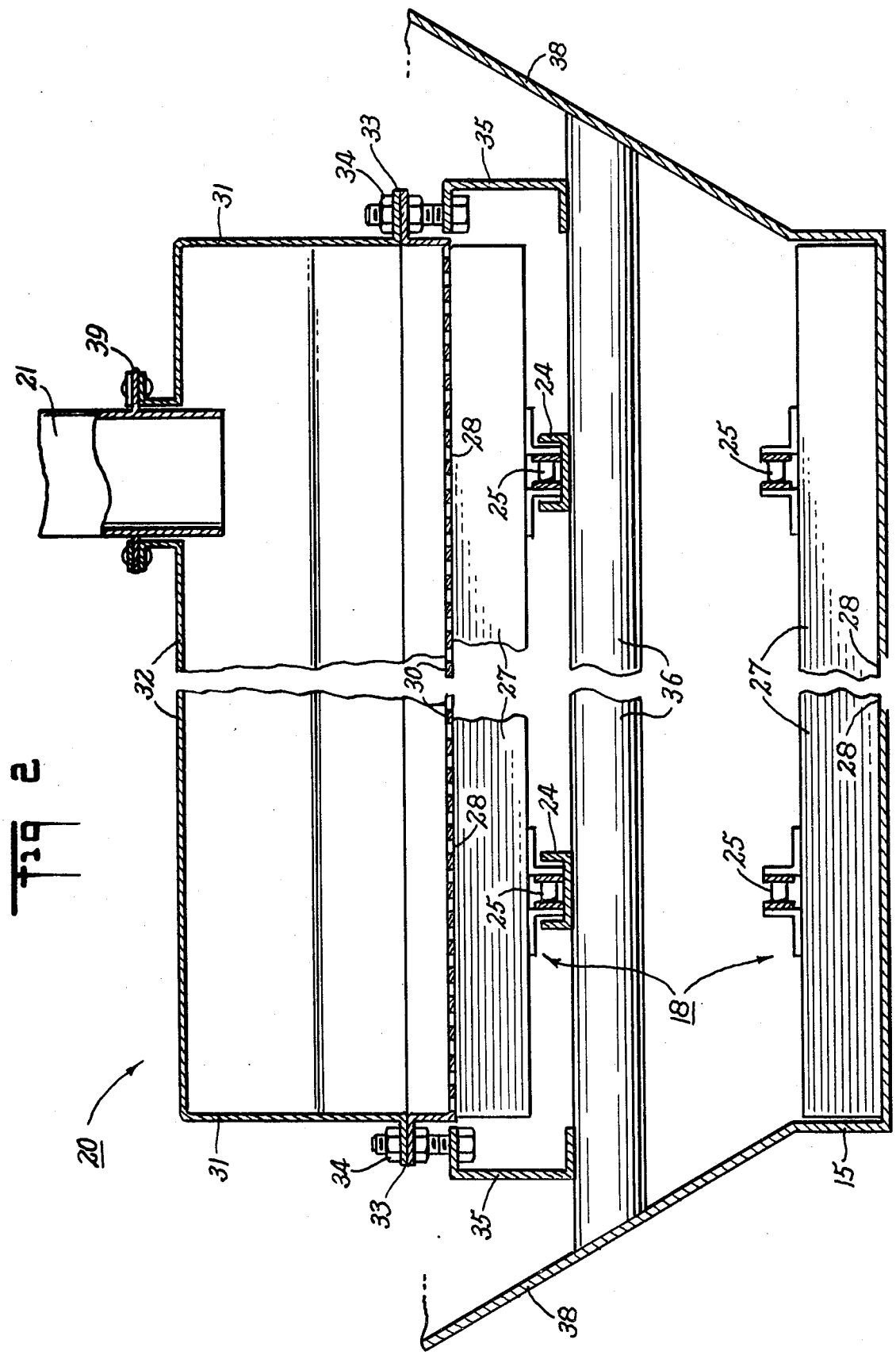

LIQUID FILTER FOR GAS WASHING APPARATUS

This invention relates to filters for use in reservoirs mounted to receive wash liquid from a gas washing apparatus.

An object is to provide novel and improved cleaning means for removing entrained particles from the filter and preventing the filter from clogging.

Another object is to provide a filter mechanism in apparatus of the above type which is suited to commercial operation.

Various other objects and advantages will be apparent as the nature of the invention is more fully disclosed.

The filter of the present invention is intended for use in a reservoir which is mounted to receive wash liquid from a gas washing apparatus of the type disclosed in co-pending application Ser. No. 207,048, filed Dec. 13, 1971, and commonly assigned with the instant application, (P-178) wherein the reservoir includes a conveyor having a series of transverse vanes or blades which advance the settled sludge along the bottom of the reservoir to a discharge lip at the end of the reservoir.

In accordance with the present invention the filter includes a screen forming one side of an enclosure and disposed below the liquid level in the reservoir in a position such that the conveyor vanes scrape the surface of the screen on their return flight, thereby removing entrained particles and maintaining the screen in clean condition.

The nature of the invention and the details of construction of the apparatus will be better understood from the following description, taken in connection with the accompanying drawing in which a specific embodiment has been set forth for purposes of illustration.

IN THE DRAWING

FIG. 1 is a side elevation of an apparatus embodying the invention with parts in section; and FIG. 2 is a transverse section taken on the line 2—2 of FIG. 1.

Referring to the drawing in more detail, the invention is shown as embodied in a gas washing apparatus including a vessel 10 containing a washing zone 11 and a drying zone 14 of any known type in which entrained droplets or suspended matter is removed from the gas stream, from which the washed and dried gases are fed into a discharge duct 12 by a suitable blower 13. The vessel 10 is mounted above a reservoir 15 into which the wash liquid containing the removed particulate material is collected. The incoming gases are introduced above the level of the collected liquid in the reservoir 15 by means of an inlet duct 16. The solid components tend to settle out from the liquid 17 in the reservoir 15 and to form a sludge which is removed by any suitable means such as a conveyor 18 by which they are discharged over a discharge lip 19 to a collector means.

In order to recirculate the wash liquid from the reservoir 15 to the washing zone 11 it is necessary to remove particulate material which would injure the recirculating pump or other apparatus with which they may come in contact. For this purpose the present invention provides a separator unit 20 which is immersed in the liquid 17 in the reservoir 15 and from which the liquid is recirculated by means of a pipe 21, pump 22 and pipe 23 to spray nozzles or other washing elements in the washing zone 11.

The conveyor 18 comprises a pair of endless chains 25 carrying a series of transverse vanes or blades 27 which engage and advance the settled sludge along the bottom of the reservoir 15 and discharge the same over the discharge lip 19. The blades 27 have edges 28 which are closely spaced from the bottom of the reservoir for the above purpose.

In accordance with the present invention the separator unit 20 comprises a screen 30 which forms one side of a closure having side walls 31 and a top wall 32. Walls 31 carry flanges 33 which rest by means of adjustable bolts 34 on support plates 35 which are disposed at the sides of the reservoir 10 beyond the area of the conveyor 18. These support plates 35 are carried on transverse members 36 which extend across the reservoir between the flights of the conveyor 18 and are attached to the side walls 38 of the reservoir. Also carried by the transverse members 36 are chain guides 24 in order to maintain the conveyor blades 27 in a controlled plane as they pass below the separator unit 20.

The arrangement is such that, by suitable adjustment of the bolts 34 the surface of the screen 30 is connected by the edges 28 of the conveyor blades 27 as they advance along their return flight. The blades thus serve to clean the screen 30 continuously during the operation of the apparatus.

In order to permit such adjustment of the screen unit, the discharge pipe 21 is connected through a universal coupling 39 to the top 32 of the unit.

It is to be understood that the screen unit may be used in connection with various types of apparatus wherein a conveyor is disposed below the level of the liquid and from which filtered liquid is to be withdrawn. The device has been shown as embodied in a particular form of gas washing apparatus for purposes of illustration only.

What is claimed is:

1. Apparatus for filtering and removing liquid from a reservoir containing a liquid carrying settleable solids, comprising a conveyor having spaced transverse vanes adapted, in their forward flight, to advance and remove settled material from said reservoir and having a return flight below the liquid level in said reservoir, a separator unit having a screen on its under surface and having a discharge pipe connected to withdraw liquid from said unit which has passed through said screen, means positioning said unit above said return flight of said conveyor with said screen in surface contact with said vanes as they pass below said screen in their return flight, whereby said vanes dislodge and remove entrained particles from said screen and prevent the clogging thereof.

2. Apparatus as set forth in claim 1 in which means is provided for adjusting the position of said screen relative to the path of said vanes.

3. Apparatus as set forth in claim 1 including a gas washing apparatus having means to pass a spray of liquid through a stream of gas and means to drain the wash liquid into said reservoir.

* * * * *